United States Patent [19]
Collins et al.

[11] 3,756,527
[45] Sept. 4, 1973

[54] METHOD OF AND APPARATUS FOR THREADING A WEB OF PLASTIC FILM ONTO A WINDUP ROLL AND WINDING IT THEREON

[75] Inventors: Richard Howard Collins, Wilmington; Richard Joseph Galli, Newark, both of Del.

[73] Assignee: E. I. Du Pont de Nemours and Company, Wilmington, Del.

[22] Filed: Oct. 29, 1970

[21] Appl. No.: 84,984

[52] U.S. Cl............... 242/56.2, 83/102, 226/97, 242/56.6
[51] Int. Cl............................................. B65h 35/02
[58] Field of Search............... 242/56.2, 56 A, 56.3, 242/56.4, 56.5, 56.6, 56.7, 56.8; 83/98, 102, 106, 107, 428, 516; 226/95, 97

[56] References Cited
UNITED STATES PATENTS

| | | | |
|---|---|---|---|
| 3,144,216 | 8/1964 | Billingsley | 83/102 X |
| 3,252,366 | 5/1966 | Karr | 83/102 X |
| 3,297,267 | 1/1967 | Wiggs | 242/195 |
| 3,552,247 | 1/1971 | Pickett | 83/98 X |

Primary Examiner—George F. Mautz
Assistant Examiner—Edward J. McCarthy
Attorney—Hoge T. Sutherland

[57] ABSTRACT

A web handling method, including a method of threading a web of plastic film onto a windup roll and winding it thereon, including the steps of moving the web continuously from a supply source along a first path by first moving means; slitting the web with web slitters as it moves in the first path to form a leader strip; cutting the leader strip and diverting it into a second moving means including at least one pneumatic strip transport tube positioned adjacent the first path; moving the strip in a second path through the tube by the second moving means; pulling the strip from the tube through a slot therein and into a third path defined by process rolls by third moving means; moving the strip in the third path by the third moving means and into operative relationship with a windup roll; expanding the strip to form the web; moving the web in the third path by the third moving means and into operative relationship with the windup roll; cutting the web and transferring it to the windup roll; and, winding the web onto the windup roll.

Apparatus is provided for performing the above described method.

16 Claims, 13 Drawing Figures

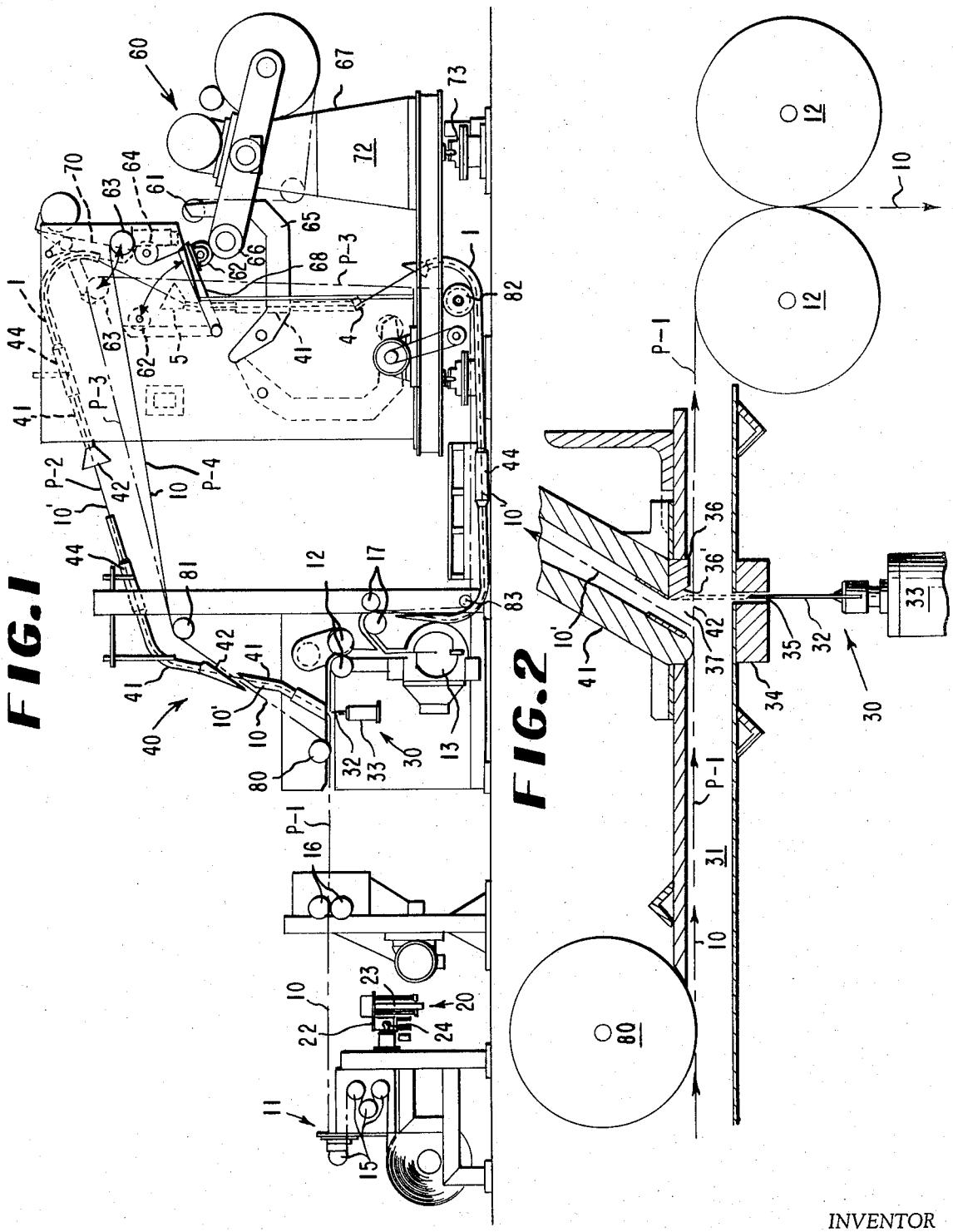

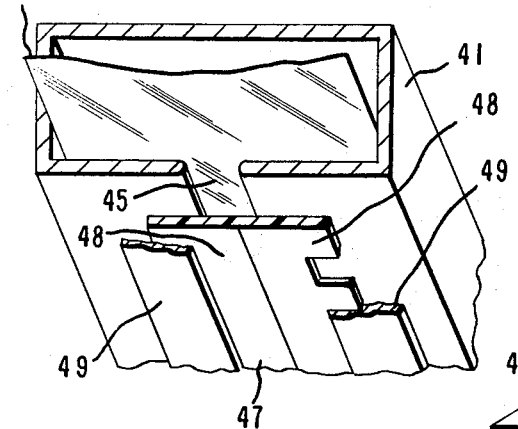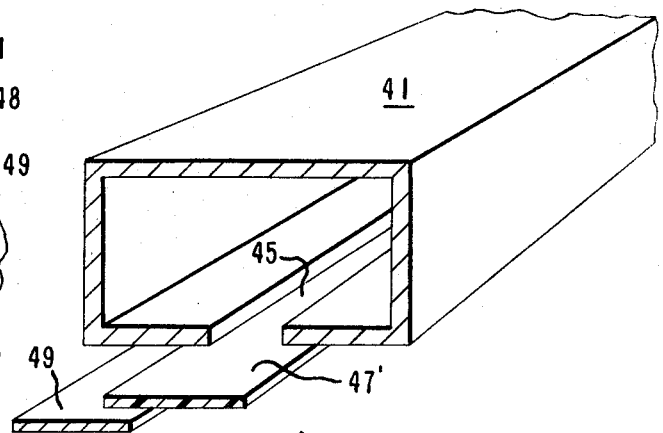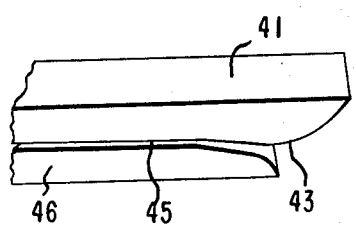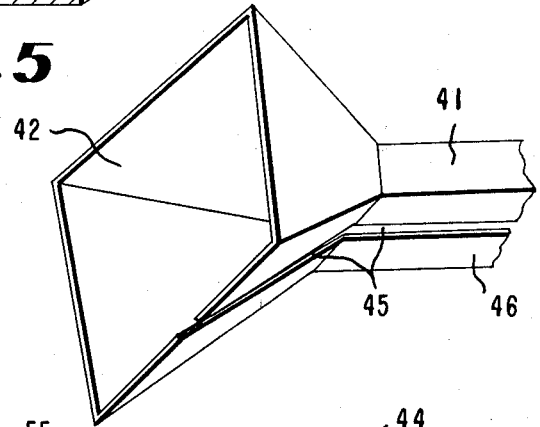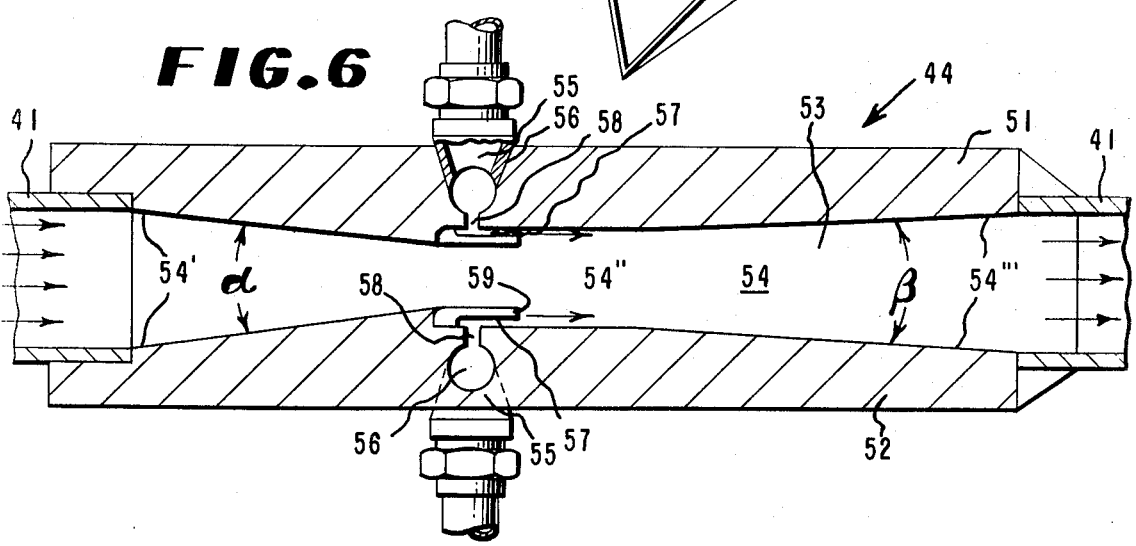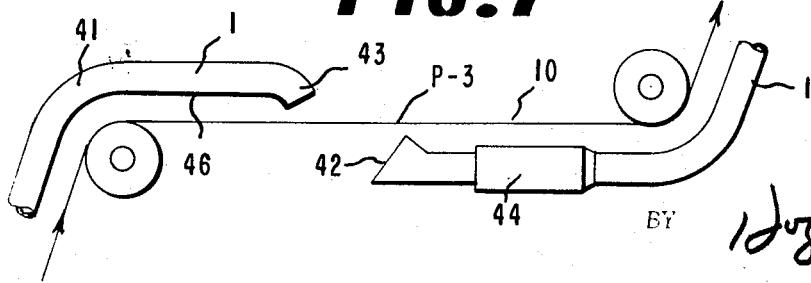
INVENTORS
RICHARD H. COLLINS
RICHARD J. GALLI
ATTORNEY

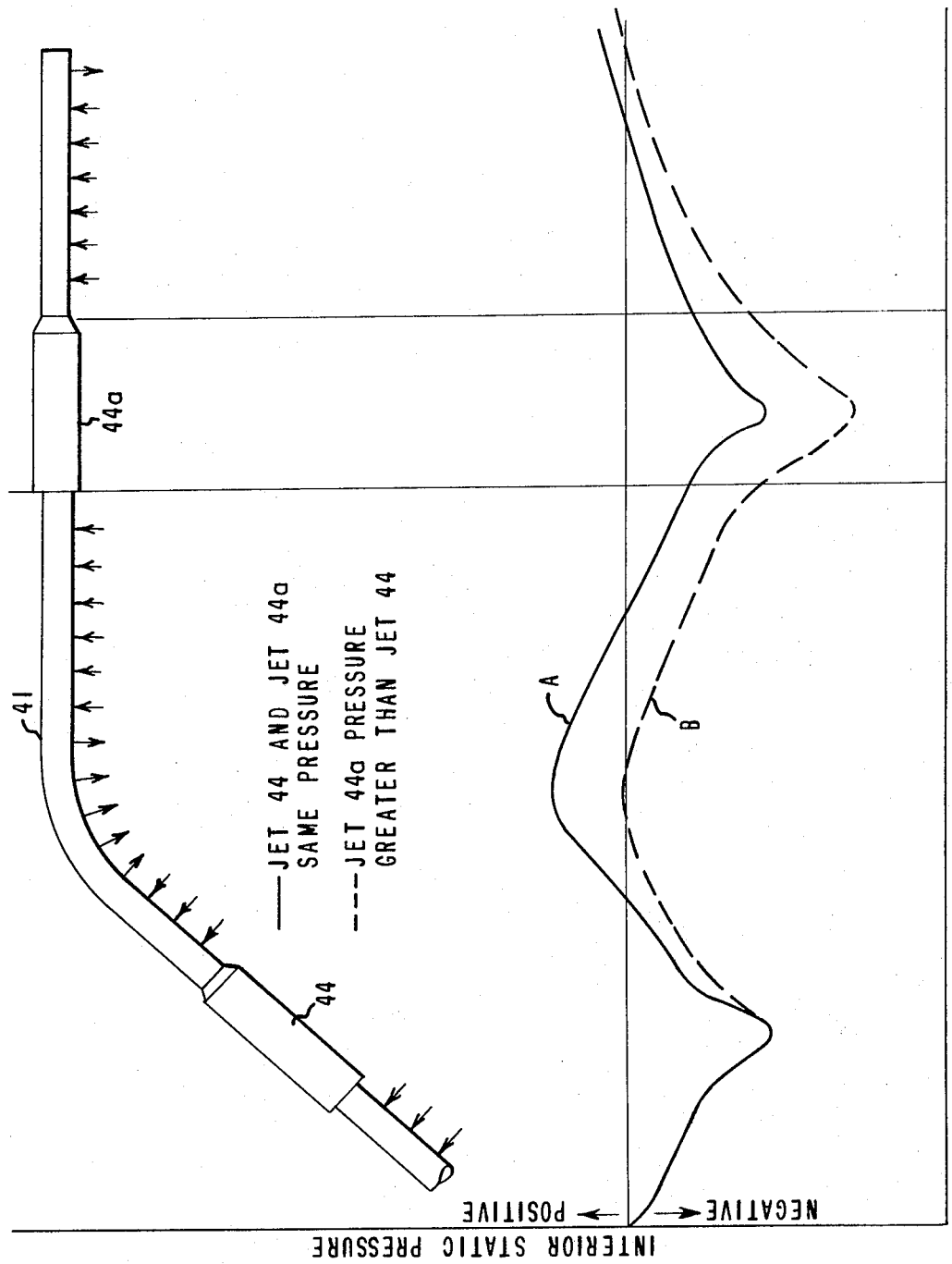

METHOD OF AND APPARATUS FOR THREADING A WEB OF PLASTIC FILM ONTO A WINDUP ROLL AND WINDING IT THEREON

BACKGROUND OF THE INVENTION

1. Field of the Invention

This invention is a web handling method and apparatus and, more particularly, is directed to a novel method of and apparatus for threading a web of plastic film onto a windup roll as the web moves at a high speed.

2. Description of the Prior Art

Web threading devices are old. It is known, for example, to use pneumatic transport systems and various mechanical means to thread a continuously moving web onto a roll.

An early example is U. S. Pat. No. 1,326,615 to Pope which shows transferring a web of paper between processing stations with the aid of a series of air nozzles or jets placed strategically along a vertical stack of calendar rolls. A narrow leader strip is cut manually from the marginal edge of the web and caused to be carried from a drier unit to the top of a calender roll stack by an endless driven guiding belt and a plurality of air nozzles and doctor blades. The leader strip is formed by pressing a knife into the margin of the web after which an air nozzle adjacent the belt is turned on causing the leader strip to be blown by the blast of air outwardly from the exit of the drier into contact with the belt. A doctor blade then detaches the leader strip with the assistance of an air blast from a second nozzle and diverts it into the bite of the top set of calender rolls. From there, the leader strip is directed into the lower rolls by other doctor and air nozzle combinations positioned at the exit ends of the rolls. After the leader strip is running satisfactorily through the calender stack, the knife is moved manually to the opposite end thereby increasing the strip to full web width.

Another example is U. S. Pat. No. 1,338,094 to Pope wherein a similar air nozzle conveying system is combined a guide plate or deflector for directing currents of air along the desired path of travel. Such deflector is positioned between vertically spaced guide rolls and curved partially around the downside roll such that curved end is preferably spaced close to the circumferential surface of the upper roll. At the upstream end of the plate, a perforated air pipe directs a high velocity airstream along the plate surface on which the paper is conveyed. A second air nozzle coacts with the first nozzle and helps deflect the leader strip toward the air stream. Thus, both nozzles deflect and forward the leader strip up and around the upper guide roll. From this point, a doctor air nozzle combination removes the strip from the roll and guides it into a second deflector plate.

Minor variations in strip tension or velocity of the air blasts in these conveying systems can create difficult operational problems and, in fact, such air nozzle systems are primarily useable for paper handling only inasmuch as paper is comparatively heavier and stiffer than limp polymeric film and, thus, easier to control by the air blasts. More importantly, the air blasts are unworkable on very thin, light weight polymeric film because highly turbulent flow rapidly shreds the film to pieces. This combined with other problems makes it virtually impossible to maintain the film under control even for very short distances.

These methods, requiring manual assistance and operable mainly for paper handling impose severe limitations of use in such devices or methods.

SUMMARY OF THE INVENTION

This invention relates to web handling and, more particularly, to a method of and apparatus for automatic threadup or positioning of light weight, wide width polymeric film at high speeds.

In the manufacture of elongated webs of polymeric film, the material must undergo numerous processing steps, such as heating, drying, washing, stretching, surface treatment, etc., before the finished web arrives at the packaging station. This usually requires moving of the web through a complicated process or work path for some of the operations must be performed in progressive stages and at variable speeds. For example, in the production of thin polymeric film a narrow relatively thick ribbon is initially cast in a thermoplastic state onto a quenching surface and rapidly cooled into a hardened condition; the web is then reheated to a temperature above the glass transition temperature and stretched, usually bidirectionally into a lightweight film many times longer, wider and thinner than the initial ribbon. The speed of the thin film beyond the stretching station is, of course, substantially higher due to the corresponding elongation. Likewise, the tension forces on the web before and after stretch elongation are considerably changed. Thus, to accommodate for these variations, the web must be conveyed or moved in predetermined paths from one work station to the next over a variety of process or transfer rolls, some of which are power driven, to provide the required tensioning and forwarding forces.

Since the polymeric material must also be surface conditioned, inspected and slit to desired width at other work stations, it is not unusual for the web to follow a complicated, tortuous process path before arriving at the windup or other work station. At the windup station, special devices and web handling techniques must be applied to effect an uninterrupted threading of the web onto a windup roll or rolls. Ordinarily, this is achieved by slitting the wide web into a plurality of narrower widths and winding the slit web sections onto a plurality of windup rolls on indexing turret type windups. Such devices include ancillary mechanisms for automatically transferring the web from a full roll to an empty core; however, they do not have the capability for automatic positioning of the web in operative relationship with a windup device for threading of the web onto the core of the first windup roll and such web must first be delivered by other means to such predetermined position before actual transfer onto this core takes place. It is during this positioning and threading startup that most continuity difficulties are encountered in the prior art for the web must be restrung through the complex process path, manually, by skilled operators. The procedure is inefficient requiring at least two skilled operators, rather hazardous and, of course, costly due to lost production from downtime. At modern high productivity rates, means must be provided for immediate disposal of the product to a remote location, otherwise great quantities of film accumulate in the operating area, further adding to the hazards.

The present invention solves these problems and other problems existent in the prior art by providing means and steps for automatically threading a web and

BRIEF DESCRIPTION OF THE DRAWINGS

FIG. 1 is a schematic view of a fully automatic web threading and winding apparatus of this invention including a traversing slitter for forming a narrow leader strip in the web; a diverter knife for cutting the leader strip and for diverting it into a first pneumatic transport tube; successive transport tubes for pneumatically moving the strip in a second path; means for pulling the strip out of the tubes through slots therein and onto process rolls defining a third path; means to reestablish the web; and, a windup roll for winding the web thereon.

FIG. 2 shows a detailed elevation view of the diverter knife assembly for cutting the leader strip and positioning it at the infeed entrance of the first transport tube.

FIG. 3 is an end sectional view of a pneumatic strip transport tube having a continuous trip removal slot therein closed two by flaps.

FIG. 4 is a sectional view of a modified strip transport tube with a single flap closure.

FIG. 5 is a view of the end portions of two typical transport tubes in a space shoot arrangement wherein the exit end of the first tube defines a flared exhaust nozzle and the input end of the second tube defines rectangularly-shaped pickup horn.

FIG. 6 is a sectional view of an eductor jet which furnishes high velocity, low turbulence fluid inside a transport tube for moving the leader strip through the tube.

FIG. 7 is a schematic view of a typical arrangement of successive pneumatic strip transport tubes for forwarding a leader strip through a tortuous process path. As shown, the tubes are positioned outside the normal operating path of the web and alternate from one side to another in accordance with change of direction of the process path of the web so that a slot in a given tube always faces the final web path.

FIG. 8 shows a fluid pressure profile of an extra long transport tube containing spaced eductor jets.

DESCRIPTION OF THE PREFERRED EMBODIMENT

Figure 9:
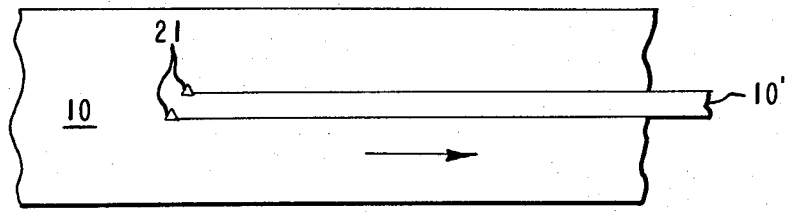
FIG. 9 is a schematic representation of the initial stage of the web threading sequence beginning with the formation of a narrow leader strip from the web (generally having selvage beads at its margins) which at this stage is moving in a first path to a first work station, such as a waste shredder.

This invention is a web handling apparatus and method.

Briefly described, such apparatus includes:

means for moving a web of material from a supply source along a first path to a first work station by first moving means;

means for forming a leader strip in the web as it moves;

means for severing or cutting the leader strip and for diverting the leader strip into a pneumatic strip second moving means for moving the web in a second path;

means for operatively connecting the leader strip to a strip and web third moving means and for pulling it into a third path adjacent a second work station;

means for expanding the strip to web width; and means for moving the web in the third path and in a predetermined relationship to the second work station, such as a web windup means including a windup roll onto which the web may be wound.

Referring to the drawing and FIG. 1 in particular, a web 10 of material, such as plastic film, to be handled by the apparatus of this invention is supplied from a supply source 11, and moved along a first path P-1 by appropriate mechanical web first moving means, such as nip rolls 12 and to a first work station or means, such as web shredder 13. The supply source 11 may be any appropriate source, for example, it may be a web of plastic film as it emerges from the tenter frame of a polyethylene terephthalate film production line.

In the embodiment shown, from the supply source 11, the web 10 first passes around guide rolls 15 and into the bite of a pair of driven nip rolls 16. The web 10 is conveyed from the nip rolls 16 along the first path P-1 by driven nip rolls 12 hence to the waste shredder 13 which features a high speed rotary blade similar to the kind described in copending application Ser. No. 713,533, filed in March 15, 1968, now U.S. Pat. No. 3,545,686.

The apparatus of the present invention provides a novel means for and method of threading this web 10 and moving such web into operative relationship with a second work station or means, such as a web windup device or means.

The prime object of this invention is to provide for improved fully automatic, self-restoring threadup of polymeric film which is safe and reliable, and to provide for any improved strip transporting or moving means which is simple, efficient and capable of forwarding (threading) a strip pneumatically over long distances and complicated process configurations at high velocity, low tension and a relatively low fluid pressure thereby to critically thread the strip, then the web and to move them in the desired path.

The web threading and winding apparatus of this invention generally comprises:

a leader strip and web forming means 20, a leader strip cutting and diverting means 30, a pneumatic leader strip second moving means 40, and a web windup device or means 60.

The leader strip forming means 20 is composed of a pair of web slitter knives 21 which are conventional industrial type razor blades, each mounted rigidly in a carriage 22 and adapted with a pneumatic actuator 23 for upward movement into contact with the moving web 10 just prior to its entrance into the nip rolls 16. Each carriage 22 is operatively connected to a common lead-screw 24 which is driven by a motor (not shown) for traversing from the point of contact with the web 10 to the outer margin thereof. Prior to the threadup sequence, the knife blades 21 are traversed to the mid-region of the web 10 within 6 inches of each other and then actuated upward for cutting out or forming the narrow leader strip 10' in the web 10. Threadup of this strip 10' and, hence, the web 10 can be effected in the inventive apparatus at web speeds ranging from 30 to 400 yards per minute or higher depending on the thickness of the web which may be anywhere from 0.00015 inch to 0.0020 inch.

After the leader strip 10' is formed, it, together with the rest of the web 10, continues for a period of time along the first path P-1, through the nip rolls 12 and into the shredder 13 prior to initiation of the leader strip severing and diverting means 30, as will now be explained.

As best shown in FIGS. 1 and 2, means 30 is located adjacent a duct 31 between the nip rolls 16 and 12. Such cutting and diverting means 30 is positioned directly below the leader strip 10' and is essentially a flat blade 32 welded to the rod end of a pneumatic actuator 33 which is attached to the machine frame by conventional fasteners. The cutting edge of blade 32 preferably has a sawtooth profile (not shown) which is intended to pierce and rupture the leader strip 10'. A blade block 34 is attached to the underside of duct 31 and contains a narrow slot 35 that serves as a guide for the blade 32. On the top side of duct 31 in line with such blade 32 is a stop block 36 which has a smooth oblique surface 36' against which the blade 32 overtravels. Surface 36' forms one lip of an entrance horn or leader strip infeed means 37 of a first strip transport tube means 41 into which the severed leader strip 10' is diverted. Such tube 41, as will be explained in greater detail, forms a part of the pneumatic strip second moving means which threadingly guides the strip through the system as a prelude to the web threadup operation.

Referring now to FIGS. 1, 3 and 5, the basic component of the strip transport or second moving means 40 comprises at least one and preferably a plurality of pneumatic strip transport tubes 41 each of which includes a rectangular-shaped, thin walled conduit made of light-weight aluminum alloy about 6 inches wide, 2 inches high and about 10 feet in length. Each tube 41 excepting the first tube, has a strip entrance opening 42 in the form of a pickup horn and an exit opening 43 in the form of a flared nozzle. Each tube 41 further is adapted with an eductor jet 44 which is connected by suitable piping that includes pressure regulation means to a remote source of pressurized air, as will be explained.

In the preferred embodiment, jet 44 is located approximately 18 and 24 inches from the exit opening 43 and furnishes streams of high velocity fluid toward the exit. The placement near the exit opening is preferred for a standard length tube since more complete mixing of the high velocity fluid and the entrained air in the tube takes place. This, in turn, results in maximum aspiration at the entrance opening 42 and relatively low turbulence downstream. The diverging pickup horn 42 is employed to facilitate entry of the leader strip 10' into tube 41 while the flared nozzle 43 assures snag free exit.

Each tube 41 further is provided with a strip removal slot 45 which extends continuously the length of the tube through the mid-portion of one of its surfaces. Slot 45 is a narrow opening about three-eighths inch wide with smooth rounded edges through which the leader strip 10' is extracted or pulled from the second path P-2 upon completion of a strip threading sequence.

In each instance, the transport tube 41 is positioned so that slot 45 is always facing the operating final process path of the web 10; i.e., the third path P-3. This side of the tube is hereafter referred to as the "slot side."

A typical tube 41 can be either straight or curvilinear provided that the curved portions have a radius not less than 9 inches and the curvatures are directed in the same general direction; that is, there are no S-shaped curves. As shown in FIG. 7, a reverse curvature is obtained by placement of separate tubes 41 in successive relationship. This assures that the slot side 46 of each tube 41 is facing the final operating or process path P-3 of the web 10. More importantly, the successive critical placement of tubes 41 enables the strip (and, then, the web) to be moved in very complicated and tortuous configurations over extended distances without excessive cumulative air pressure buildup.

Under ideal conditions, the leader strip 10' can be conveyed through the transport tubes 41 at speeds up to 2,000 feet per minute. The top speed of conveyance is only limited by the feed or movement rate of the strip from upstream processing equipment. Conveyance over long distances is best accomplished, when the static pressure within the tube 41 is no greater than atmospheric and preferably at a subatmospheric level. Under such conditions, the strip pull-out slot 45 is provided with a slot seal or closure means 47 which minimizes excessive leakage but is relatively simple mechanically to permit easy, rapid removal of the leader strip 10' from the tube 41. As shown in FIG. 3, the slot closure means 47 covers the strip pull-out slot 45 the entire length of the transporter tube 41 and preferably consists of two abutting, flexible polymeric film flaps 48 attached to the external surface of the tube 41 by pressure sensitive adhesive tapes 49 which function as hinges. The flaps 47 are made of a 0.003 inch thick polyester material which remain sufficiently stiff against the slight pressure differential between the inner and outer sides of the tube. Portions of the flaps under the tapes 49 may cut out, as shown, to improve the flexing character of the material.

A modified version of the slot closing means is shown in FIG. 4, which version includes a single slot closing means or flap 47' for closing the slot 45 upon application of suction in the tube 41 by the jets 44 to close it. As the jets 44 are disengaged, the closing means 47' is free to hinge so that the strip 10' may be easily pulled through the slot 45, from the second path P-2 and into the work or third path P-3.

Rferring again to FIG. 1, ultimately, the terminal end of the last strip transport tube 41 train is aimed directly into the nip of a pair of grooved tension rolls 17 that are placed at the entrance to a secondary or auxiliary duct of waste shredder 13 or first work station. Rolls 17 are driven by a variable speed drive which are intended to increase the tension of the moving web 10 back to the nip rolls 16. At the opening of inlet duct 31, a diverter roll is also provided for guiding first the strip 10', then the full width web 10 after the strip 10' is pulled out of the tubes 41 through the slots 45 and onto the process rolls which define the work or process path P-3.

Referring particularly to FIG. 6, the eductor jet 44 of the pneumatic strip moving means 40 essentially is a device compising upper and lower venturi plates 51 and 52 which are fixedly held together in spaced relationship by side plates 53, only one of which plate is shown. The space between the venturi plates 51 and 52 defines an open passageway 54 through which the leader strip 10' moves. Passageway 54 is an accurately contoured channel composed of a converging nozzle 54', a minimum throat 54'' and an expanding nozzle 54''' each blending smoothly together and at the junctions with the tube 41.

Pressurized fluid is introduced into the jet 44 in the vicinity of the throat 54'' by way of inlets 55 that communicate downstream with distribution manifolds 56 and upstream with a source of pressurized air which is regulated to about 40 scfm and 40 psig. The manifolds 56 in turn feed into narrow slot orifices 57 by way of spaced distributor apertures 58 which are circular holes drilled into the venturi plates at regular intervals across the width of passageway 54. Orifices 57 likewise extend across the passageway 54 width and are formed by flat caps 59 which direct the high velocity fluid generally along the upper and lower surfaces of the expanding nozzle 54''', as shown by the arrows in FIG. 6. Continuity of the open slot 45 along the longitudinal axis of the tube 41 is maintained through centerline of jet 44 by a split arrangement of the venturi plate 52 and the orifice cap 59. The aforementioned components are each attached to the respective side plates 52 thereby forming a narrow separation that coincides with the slot 45 of the tube 41.

In the preferred embodiment, the venturi portion of passageway 54 is eesigned for specific fluid flow conditions capable of producing maximum aspiration at the entrance end of the tube and high velocity, low turbulence at the exhaust end. These conditions are met by a venturi featuring a convergence angle $\alpha$ in the nozzle 54' of about 14°, an expansion angle $\beta$ in nozzle 54''' of about 6½° and a minimum area throat 54'' approximately one-half the cross section area of a tube. The above proportions enable operation of the jet 44 at relatively low static pressures without appreciable decrease in aspiration or fluid velocity.

It is essential that to impose maximum drag on the leader strip 10', the fluid flow in the nozzle 54''' be maintained at high velocity and low turbulence. In other words, it is desirable to establish fluid flow patterns generally parallel to the nozzle walls since high turbulence in this section results in an unstable condition that results in twisting and eventual shredding of the strip 10'.

In the preferred embodiment, each strip transport tube 41 is no greater than 10 feet in length; however, longer lengths can be utilized to a limited extent provided that the tube is adapted with booster jets and adjusted for operation at a higher manifold pressure. Depending on the length of the tube, two or more booster jets similar to the eductor jet 44 are incorporated at spaced distances along the tube 41 and the initial jet 44; that is, the one nearest the entrance end adjusted at a substantially lower manifold pressure than that ordinarily encountered in the preferred embodiment. Each successive jet thereafter along the transport tube is adjusted to a slightly higher manifold pressure in order to maintain stream velocity and to offset the steadily increasing mass flow and internal static pressure. There is a practical limit for a long length tube beyond which the cumulative effects of high manifold pressures and mass flow render the tube inoperable. As more booster jets are added to the transport tube, the manifold air pressure level eventually attains "choked" flow condition in the venturi. Any furthe increase in the pressure will not result in a corresponding increase in fluid velocity and aspiration. Without higher aspiration to compensate for the increasing internal static pressure, the pressure in the downstream portion of the tube rises above atmospheric level resulting in excessive air leakage and blow out of the strip 10'. Long before this unstable condition arises, the manifold pressure in the jet 44 reaches a level where disruptive fluid flow patterns develop in the throat 54'' region. These are relatively narrow streams along the walls of the passageway 54 composed of high velocity, highly turbulent fluid. As the leader strip 10' moves through, it is sporadically captured within the streams, twisted and subjected to severe flutter and shattered to pieces. Thus, tubes 41 longer than thirty feet and featuring more than three eductor jets are not considered practical for conveyance of light weight polymeric strip material. It is noted that as the thickness of the strip material and the feed rate is increased, higher fluid flow conditions can be tolerated in spite of the destructive effects. Conversely, light gauge film and low feed rates require correspondingly lower fluid flow conditions within the eductor jet. This is further illustrated in the example below.

In FIG. 8, a tube about 10 feet long adapted with a booster jet 44a is shown with corresponding static air pressure profiles depicting two operating modes. Curve A traces the pressure profile along the longitudinal axis of a tube 41 when both jets are operated at the same manifold pressure. In this mode, the static pressure below the eductor jet 44 rises above atmospheric level. This, of course, produces a high leakage condition through pull-out slot 45. Because the static pressure is above normal; that is, above atmospheric level, the amount of aspiration developed by booster jet 44a is less thus reducing the forwarding ability of the transport tube 41. Curve B traces the static pressure profile along a tube 41 axis wherein the booster jet 44a is operated at a slightly higher manifold pressure to produce a lower pressure in its venturi. At this mode, jet 44a develops greater aspiration which partly offsets the higher static pressure in the region between the jets.

As shown in FIGS. 1 and 5, the above described difficulties are obviated by the use of the short length transporter tube 41 arranged in a surprisingly simple fashion. Each tube is a self-contained conveyor adapted with its own eductor jet 44, pickup horn 42 and flared nozzle 43. The tubes 41 are arranged in successive order so that the pickup horns 42 are aligned with the flared nozzles 43 of the upstream tubes and separated by an intervening air space. Depending upon the configuration of the final web process path, some tubes 41 may be straight and others are shaped to suit the path. In any case, the running length of any tube 41 preferably is limited to a maximum of 10 feet. The air space serves as a pressure release which means that it allows the fluid stream in the tube 41 to expand to atmospheric level upon emerging from the flared nozzle 43. This allows each successive tube 41 to operate at substantially identical fluid flow conditions, thereby reducing consumption of pressurized air, the deleterious noise level and generally simplifying operability.

It is essential that the distance of the air space between the successive tubes 41 in the horizontal plane to be no less than 12 and no greater than 18 inches. A distance less than 12 inches does not allow for adequate expansion of the fluid stream issuing from nozzle 43 and a major portion of the fluid stream flows directly into a successive tube, causing an undesirable increase in the static pressure of that tube. Furthermore, the presence of the pickup horn 42 at close range disrupts the stream, resulting in the leader strip 10' being deflected from the mouth of the horn. Conversely, forwarding or "shooting" a leader strip 10' horizontally across an air space greater than 18 inches is impractical due to the gravitational pull on the material. When the transport tubes 41 are vertical and the leader strip 104' is being forwarded downwardly, it is possible to "shoot" the strip 10' across an air space greater than 18 inches due to the assistance of gravity.

In addition to simplifying the fluid flow problems, the air space feature greatly increases the flexibility of the pneumatic transport tube concept in web handling operations that otherwise cannot tolerate permanent obstructions. For example, as shown in FIG. 7, an air space is located at a point where the web changes direction over guide rolls thereby enabling permanent installation of the transport tubes 41. Likewise, an air space can be incorporated where the moving web must travel unobstructed, as at an inspection station. The transport tubes 41 are positioned so that the leader strip 10' is "shot" across the station thus leaving the line of sight space clear. As is apparent, the space shoot feature permits permanent installation of stationary tubes, which when properly aligned and adjusted provide a remarkably simple and reliable strip threadup system of great, and highly sought after flexibility.

The leader strip 10' is moved in the second path P-2 by and through the strip second moving means 40 to the tension nip rolls 17 and into the shredder 13, prior to being pulled from the tubes 41 and into the third path P-3 defined by the process rolls where it is adapted to be converted to a web as will be described. In this process path P-3, the web 10 will be in position to be threaded onto a windup roll or, stated another way, such web will be in operative working relationship with the web windup means 60 or other work means. It is this critical path that this invention automatically seeks and finds in a novel manner of great usefulness in the web handling arts.

The fully automatic threadup system involves continuous windup of a 60 inch wide web of 0.00015 to 0.0020 inch thick polyester film at speeds approaching 600 yards per minute. The threadup system is integrated with the web windup means 60 which is a commercial indexing turret type unit similar to Model 30–322 manufactured by the Black Clawson Company, Fulton, N.Y. Windup 60 is adapted with standard auxiliary mechanisms for automatic transfer of the web from a full to an empty core. The positioning of the web in operative relationship to this windup device (i.e., in path P-3) is the touchstone of this invention.

In this work or web process third path P-3, the strip 10' (and then the web 10 which follows the strip 10') passes from nip rolls 16 under a diverter roll 80, over an upper guide roll 81 and tension wrap roll 63, under lower guide rolls 82 and 83 and into the bite of the nip rolls 17. Rolls 80, 81, 63, 82 and 83 are the process rolls of the apparatus and define the web process path P-3. From this path P-3 the web 10, after being expanded from the strip 10', may be threaded onto a windup roll of the web windup means 60.

Briefly, the web windup means 60 includes a pivoted, driven enveloper roll 61, which includes a built-in web severing knife (not shown), a driven lay-on roll 62; a driven tension wrap roll 63; and an idler tension sensing roll 64. The enveloper roll 61 is rotatably journaled on two swingarms 65 activated by motor driven screw jacks (not shown) that swing the roll 61 through a 95° arc thereby providing sufficient wrap of the web about an empty core 66, which has been previously indexed into the windup position by the indexing turret 67. Directly above the enveloper roll 61 and coacting with the empty core 66 is the lay-on roll 62 which is rotatably journaled on pivot arms 68 that are affixed to the main machine frame. Pneumatic cylinders (not shown) pivot the lay-on roll 62 from the retracted position (shown in dotted outline) to a web windup operating position against the core 66. During roll formation, lay-on roll 62 maintains a predetermined compression force against the surface of the web 10 to assure a stable wrinkle-free windup.

Similarly, the tension wrap roll 63 is mounted on pivot arms 70 which are actuated between a retract position (dotted lines) to an operating position by pneumatic cylinders (not shown). In the operating position, the tension wrap roll 63 urges the web 10 to wrap around the tension sensing roll 64 sufficiently so that the inherent tension in the material is measured by spring mounted force transducers operatively connected to the stationary antifriction bearings in which the tension roll 64 is journaled. The aforementioned mechanisms are standard auxiliary equipment ordinarily furnished by the manufacturer with the windup apparatus. In the present instance, the transfer mechanism has been relocated relative to the indexing turret 67 in order to accommodate the automatic threadup scheme which delivers the web from an overhead position. Another modification to the windup apparatus 60 but not part of the commercial package is the mounting of the turret base 72 on slide guides 73 which are short-tracks perpendicular to the direction of web travel. Pneumatic cylinders (not shown) are connected to the base 72 and oscillate the entire web windup unit 60 back and forth through a short stroke during a windup sequence.

OPERATION

Prior to starting up the apparatus of this invention for positioning a web 10 in operative relationship with the web windup means 60 and for winding the web 10 onto a core thereof, certain process conditions must be preset and activated before the automatic sequence can be initiated.

As best shown in FIG. 1, the web 10 must first be fed along a first path P-1 by the driven nip rolls 12 from the supply source 11 through the entrance duct 31 and into the waste shredder 13 which has been previously activated by an operator. At the web windup means 60, the enveloper roll 61 is in the down position and lay-on roll 62 in retracted position, as is tension wrap roll 63. The movement of these components is accomplished by the actuators (previously mentioned) and are an integral part of the commercial windup unit.

An empty bobbin or core 66 is placed on the indexing turret 67 of the web windup means 60 and is ready to receive the web 10 to be wound thereon. When the traversing slitter knives 21 have been retracted and shifted to the mid-center of the web 10, the operator activates the air supply system to the eductor jets 44 of the transporter tubes 41 and the automatic web threadup sequence is ready for operation.

The operator then activates the slitter actuator 23 which moves the knives 21 upwardly into the moving web 10 and, as shown in FIG. 9, the narrow leader strip 10' is formed from the mid-portion thereof. This leader strip 10' and the main body of the web 10 both continue to be moved along the first path P-1 and into the waste shredder 13 by the first moving means 12 until the operator energizes actuator 33 of the diverter-knife means 30 which pushes the knife 32 into the leader strip 10'. The sawtooth edge of the knife 32 pierces and ruptures strip 10' and with the assistance of the diverter jet deflects or diverts the leading edge of the strip 10' into the first transport tube 41 of the second moving means 40 to start the threadup operation.

From this point on, threadup of the leader strip 10' takes place automatically at high speed, that is, the strip is conveyed from one tube 41 to the next in the second path P-2 until it finally moves into the nip of tension rolls 17 and, hence, into the auxiliary second entrance of waste shredder 13. These rolls 17 (i.e., the third moving means) are modified by spaced circumferential grooves, not shown, that permit air flow through the nip thereby facilitating positive moving of the strip 10' into the shredder 13.

Figure 10:
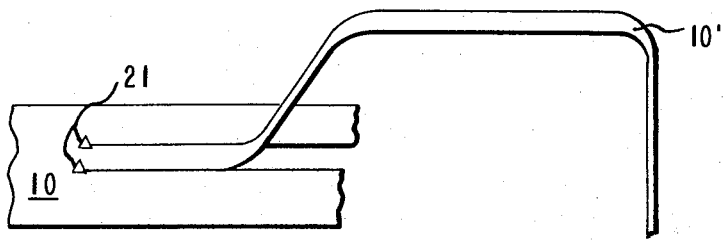
FIG. 10 shows the web of FIG. 9 after the narrow leader strip has been cut and diverted into a second path for movement therein; the remaining portions of the web still continuing along the first path to the waste shredder.

At this time, as shown schematically in FIG. 10, the leader strip 10' and the main portion of the web 10 are once again being fed simultaneously into the shredder 13; however, as shown in FIG. 1, the leader strip 10' is moving along the second path P-2 at relatively low tension. While the main portion of the web continues along the first path P-1 to the shredder 13, the operator now increases momentarily the speed of the rolls 17, thereby applying an increased tension to the leader strip 10' as far back as the nip rolls 16. This causes the strip 10' to be pulled out of the tubes 41 by way of the slots 45 therein onto the diverter roll 80, the upper guide roll 81, the tension wrap roll 63 and the lower guide rolls 82 and 83 so that it, the strip 10', now is moving along path P-3 which constitutes the final operating path. These rolls together comprise the process rolls of the apparatus and the path P-3 is the process path.

Figure 11:
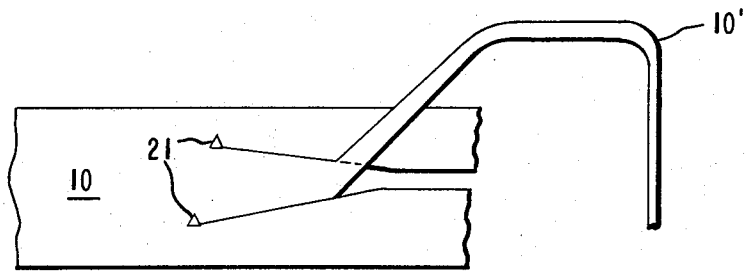
FIG. 11 shows the web of FIG. 9 following pull out of the leader strip from the transport tubes defining the second path and onto process rolls defining a third path. At this stage the slitter knives traverse outwardly increasing the strip to web width.

Concomitantly, the lead screw of the traversing slitter knives 21 is activated and, as shown in FIG. 11, the slitter knives 21 begin lateral movement toward the margins of the web 10 to form or restore the web again. During this interval, the tension on the expanding web 10 is progressively increased by the lower guide roll 82 which is driven by a variable speed motor to the operating process level.

Figure 12:
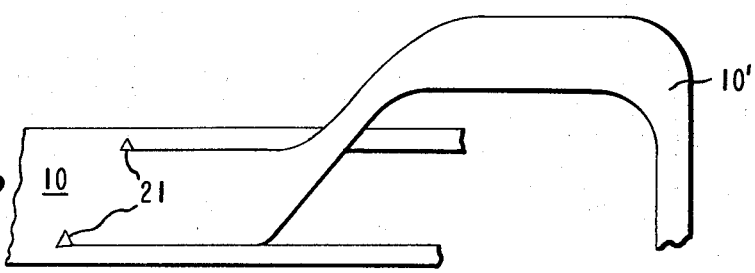
FIG. 12 shows the normal operating condition of the web of FIG. 9 in the third or process path after the slitter knives have been positioned to form the web and to remove the narrow selvage beads from each margin thereof, which beads continue in the first path to the waste shredder.

When the knives 21 have traversed to within 2 inches of the margins, as shown in FIG. 12, the web 10 (minus selvage beads) has been established and such web 10 is in operative position ready for transfer to the core 66 of the web windup 60 or to another work means. This completes the critical web threadup sequence of this invention with the full web 10 now moving in the process path P-3 defined by the rocess rolls 80, 81, 63, 82 and 83, between the nip rolls 16 and 17.

During this interval, the empty core 66 has been brought up to the web velocity. The enveloper roll 61 and lay-on roll 62 are now activated and engage the web 10 around the rotating core 66. In the maneuver, the knife on the enveloper roll 61 severs the web 10 thereby wrapping the incoming leading edge around the core 66. The trailing edge of web 10 continues to the waste shredder 13. The final operation takes place when the tension wrap roll 63 is pivoted into contact with the tension sensing roll 64. From this point on the web is moving in its windup fourth path P-4 and the web winding operation is continuous thereafter. As the core 66 attains full size, the indexing turret 67 moves a second empty core into position and the enveloper roll 31 sequence is repeated.

In general, the threadup system performs more efficiently at higher web speeds. At 300 yards per minute, the threadup time from formation of the narrow leader strip 10' to full sheet width is between 10 to 12 seconds. The high performance characteristics and versatility of the threadup scheme makes it ideally suited for modern polymeric film manufacture which process webs in excess of 200 inches in width.

Figure 13:
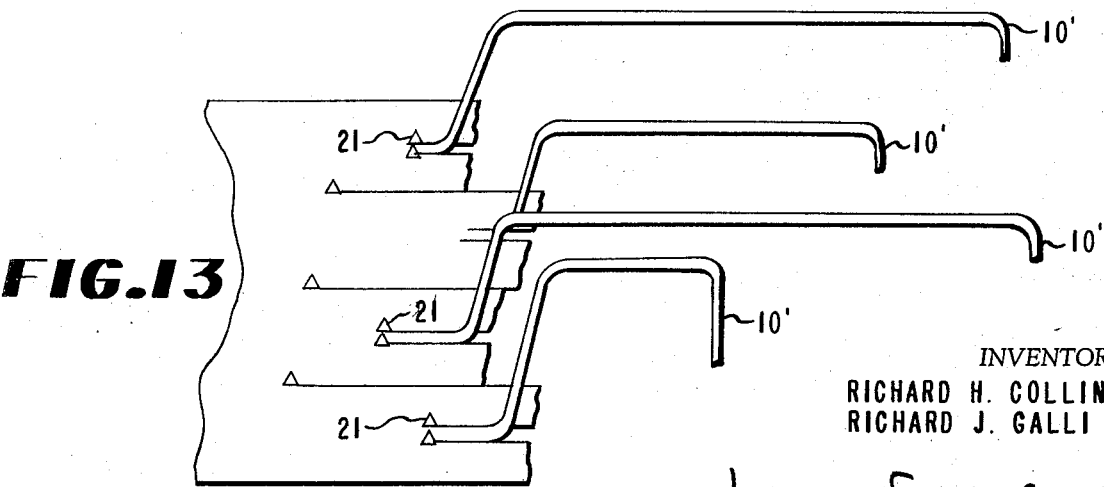
FIG. 13 shows an alternative multiple threading arrangement for transforming an extra wide width web onto a plurality of windup rolls.

As shown in FIG. 13, a typical wide width production line can be equipped relatively easily for conversion of a 240-inch wide web into a plurality of narrow webs by simultaneous slitting and windup with the assistance of the threadup system. Each windup station is adapted with the aforementioned threadup system and designed to operate either jointly or independently of the adjacent units. The flexibility of the system does not restrict placement of the individual windups for optimum processability.

METHOD

Briefly, the web handling method of this invention including the method of threading a web of plastic film onto a windup roll and winding it thereon includes the steps of moving the web 10 continuously from the supply 11 source along the first path P-1 by first moving means 12; slitting the web 10 with web slitters 21 as its moves in the first path P-1 to form the leader strip 10'; cutting the leader strip 10' and diverting it into a second moving means 40 including at least one pneumatic strip transport tube 41 positioned adjacent the first path P-1; moving the strip 10' in the second path P-2 through the tube or tubes 41 by the second moving means 40; pulling the strip 10' from the tube 41 through the slot 45 therein and into the third path P-3 defined by process rolls by third moving means 17; moving the strip 10' in the third path P-3 by the third moving means 17; expanding the strip 10' to form the web 10; moving the web 10 in the third path P-3 by the third moving means 17 and into operative relationship with a windup roll means 60; cutting the web 10 and transferring it to the windup roll 66; and, winding the full width web 10 onto the windup roll 66.

This novel method and apparatus as described hereinabove and hereinbefore has utility and provides an unobvious means and way of handling a web and strip whereby automatic pneumatic threading, as described, becomes a part of art.

We claim:

1. A web handling method including the steps of:

moving a web along a first path by web first moving means;

slitting the web as it moves in the first path to form a leader strip;

moving the strip formed from the web by slitting it along a second path by pneumatic strip second moving means;

pulling the strip from the second path and into a third path;

expanding the strip into web width; and, moving the strip and then the web so expanded along the third path by strip and web third moving means.

2. The method of claim 1 including the further steps of:

cutting the strip and diverting it from the first path and into operative association with the second moving means;

and wherein the strip is moved by the second moving means through a plurality of pneumatic strip transport tubes defining the second path and directing the strip as it emerges from one tube across an open space into the next tube.

3. The method of claim 1 wherein the third moving means is adapted to move the web into operative association with a web windup means.

4. A method of threading a full width web onto a windup roll including the steps of:

moving the web continuously at a first speed along a first path by first moving means;

slitting the web as it moves to form a leader strip;

moving the leader strip along the first path by the first moving means;

severing the leader strip and diverting it from the first path and into a pneumatic leader strip second moving means including at least one tube having a strip removal slot therein;

moving the leader strip at the first speed by the second moving means along a second path through the tube and into operative association with third moving means;

increasing the tension on the leader strip by moving it momentarily at a second speed greater than the first speed by the third moving means to pull the leader strip from the slot in the tube and position it in a third path adjacent the windup roll;

moving the strip at the first speed again in the third path by the third moving means;

expanding the strip into web width;

moving the web so expanded along the third path at the first speed by the third moving means; and threading the web onto the windup roll.

5. A strip handling method including the steps of:

moving the strip in a path by pneumatic means including at least one strip transport tube having a strip removal slot therein extending continuously the length of such tube through a mid-portion of one of its surfaces in the slot side;

pulling the strip from the tube, through the slot and into a process path; and moving the strip in the process path.

6. Apparatus for moving a web of material including:

means for moving such web from a supply source along a first path;

means for forming a leader strip in a web as it moves;

means for cutting the leader strip and for diverting the leader strip into a pneumatic strip second moving means for moving the web in a second path;

means for operatively connecting the leader strip to a strip and web third moving means for pulling the leader strip from the second moving means and into a third path;

means for expanding the strip into web width; and means for moving the web so expanded along the third path.

7. The apparatus of claim 6 wherein the second moving means includes at least two strip transport tubes spaced from each other and shaped and positioned to conform to the process configuration and wherein each tube has a strip removal slot therein, which slots face the third path of the web.

8. The apparatus of claim 6 wherein the leader strip is pulled from each transport tubes through the slot therein and onto process rolls defining the third path.

9. The apparatus of claim 6 including a flap member for closing each slot.

10. The apparatus of claim 6 wherein two flap members comprise the slot closure.

11. The apparatus of claim 6 wherein the second moving means is a series of pneumatic strip transport tubes spaced apart from each other and having exits and pickup horns and wherein the exit of one tube is operatively aligned with the pickup horn of the next-in-line tube, each of the tubes being equipped with eductors whereby the strip is controllably shot across the space between successive tubes.

12. Apparatus for winding a web comprising:

a web waste shredder for receiving the web;

means for moving the web in a first path to the shredder;

a slitter with traversing means or moving laterally a pair of vertically actuable knife blades upstream of the shredder for forming a leader strip from the web;

an aspirator jet;

a retractable diverter-knife means for cutting the strip and diverting it into the opening of the aspirator jet located opposite the diverter-knife means thereby to initiate a strip threading sequence;

at least one strip transport tube downstream of the aspirator jet and suitably contoured generally to follow a process path of the web for guiding the strip, each tube comprising a converging pickup horn at the input end of tube for facilitating entry of the strip, a flared exhaust nozzle at the exit end of the tube for snag free removal of the strip, a slotted eductor jet interposed in the tube near the exhaust nozzle for supplying a stream of high velocity fluid parallel to the tube wall, means defining a continuous slot in each tube for removal of the strip from the tube, and a flap for closing each slot;

means for pulling the strip through the slot of each tube and into a third path; and third moving means for moving the leader strip, then the web in the third path.

13. The apparatus of claim 12 wherein the diverter-knife means is adapted to cut the strip and immediately and substantially simultaneously direct it into the opening of the aspirator jet.

14. An apparatus for winding a web onto a windup roll including:

first moving means for moving the web along a first path;

means for forming a leader strip in the web as it moves in the first path;
pneumatic second moving means;
means for cutting the leader strip and diverting it into the pneumatic second moving means including at least one tube having a slot therein for moving the strip in a second path;
   third moving means for pulling the strip from the slot in second moving means and into a third path and moving in such third path;
means for expanding the strip into web width whereafter the third moving means moves the web along the third path and into operative association with a web windup means;
means for cutting the web and threading it onto a windup roll of the web windup means; and
means for winding the web onto the windup roll.

15. A strip handling apparatus including:
pneumatic means for moving the strip in a path including at least one strip transport tube having a strip removal slot therein extending continuously the length of such tube through a mid-portion of one of its surfaces in the slot side;
means for pulling the strip from the tube, through the slot and into a process path; and
means for moving the strip in the process path.

16. A web handling method including the steps of:
moving a web along a first path;
engaging the web with web slitting means to form a leader strip from the web;
severing the leader strip from the web and diverting it into a pneumatic second moving means;
moving the leader strip along a second path by the pneumatic second moving means;
pulling the leader strip from the second path and into a third path; and
moving the web slitting means outwardly thereby expanding the leader strip into the web width as it moves in third path.

* * * * *